(12) United States Patent
Agashe et al.

(10) Patent No.: US 7,599,655 B2
(45) Date of Patent: Oct. 6, 2009

(54) METHOD AND APPARATUS FOR BROADCAST SERVICES IN A COMMUNICATION SYSTEM

(75) Inventors: Parag A. Agashe, San Diego, CA (US); Roy Franklin Quick, Jr., San Diego, CA (US); Jun Wang, La Jolla, CA (US); Raymond T. Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 496 days.

(21) Appl. No.: 10/335,626

(22) Filed: Jan. 2, 2003

(65) Prior Publication Data

US 2004/0132402 A1    Jul. 8, 2004

(51) Int. Cl.
*H04H 1/00*    (2006.01)
(52) U.S. Cl. .............. 455/3.01; 455/3.02; 455/179.1; 370/337; 370/352
(58) Field of Classification Search ............ 455/3.02, 455/3.01, 418, 179.1, 185.1, 186.1; 370/352, 370/337, 395, 537; 348/734
See application file for complete search history.

(56) References Cited

U.S. PATENT DOCUMENTS

| | | | | |
|---|---|---|---|---|
| 5,970,072 | A * | 10/1999 | Gammenthaler et al. | 370/537 |
| 6,385,200 | B1 * | 5/2002 | Erami et al. | 370/395.42 |
| 6,477,377 | B2 * | 11/2002 | Backstrom et al. | 455/446 |
| 6,647,000 | B1 * | 11/2003 | Persson et al. | 370/330 |
| 6,680,920 | B1 * | 1/2004 | Wan | 370/311 |
| 6,879,573 | B1 * | 4/2005 | Huo | 370/337 |
| 2002/0176408 | A1 * | 11/2002 | Kangas | 370/352 |
| 2003/0054807 | A1 * | 3/2003 | Hsu et al. | 455/414 |
| 2003/0064679 | A1 * | 4/2003 | Kim | 455/3.02 |

(Continued)

FOREIGN PATENT DOCUMENTS

EP    0928084 A2    7/1999

(Continued)

OTHER PUBLICATIONS

ETSI: "Universal Mobile Telecommunications System (UMTS); Multimedia Broadcast/Multicast Service (MBMS); Stage 1, 3GPP TS 22.146 version 5.2.0 Release 5", ETSI TS 22.146 v5.2.0, pp. 1-15, Mar. 2002.

(Continued)

*Primary Examiner*—Nay A Maung
*Assistant Examiner*—Tuan H Nguyen
(74) *Attorney, Agent, or Firm*—S. Hossain Beladi; Rupit M. Patel

(57) ABSTRACT

A method, apparatus and system provide for efficient use of communication resources for providing broadcast services in a communication system. A receiver receives a first broadcast controller identification from a first base station, and a second broadcast controller identification from a second base station. A controller coupled to the receiver determines whether the first and second broadcast controller identifications are associated with use of a common set of broadcast parameters. A transmitter transmits a request for transmission of a new set of broadcast parameters when the first and second broadcast controller identifications are not associated with use of the common set of broadcast parameters. After receiving the new set of broadcast parameters, the receiver uses the new set of broadcast parameters for receiving broadcast services.

28 Claims, 6 Drawing Sheets

U.S. PATENT DOCUMENTS

| | | | |
|---|---|---|---|
| 2004/0005860 A1* | 1/2004 | Kato et al. | 455/3.01 |
| 2004/0095515 A1* | 5/2004 | Tajima | 348/734 |
| 2005/0048963 A1* | 3/2005 | Kubler et al. | 455/423 |

FOREIGN PATENT DOCUMENTS

| | | |
|---|---|---|
| EP | 11851252 | 3/2002 |
| GB | 2346512 A | 8/2000 |
| RU | 2187205 | 8/2002 |
| WO | 00008883 | 2/2000 |
| WO | 0247407 | 6/2002 |
| WO | 03063418 | 7/2003 |

OTHER PUBLICATIONS

ETSI: "Universal Mobile Telecommunications System (UMTS); Radio Interference for Broadcast/Multicast Services (3GPP TR25.925 version 3.3.0 Release 1999)", ETSI TR 125 925 v3.3.0, pp. 1-35, Dec. 2000.

International Search Report PCT/US03/41311, International Search Authority-European Patent Office, Feb. 25, 2005.

International Preliminary Examination Report—PCT/US03/041311, IPEA/US, May 17, 2006.

* cited by examiner

METHOD AND APPARATUS FOR BROADCAST SERVICES IN A COMMUNICATION SYSTEM

FIELD

The present invention relates generally to the field of communications, and more particularly, to communications of broadcast services in a communication system.

BACKGROUND

In a wireless communication system, unnecessary and excessive transmissions by a user may cause interference for other users in addition to reducing the system capacity. The unnecessary and excessive transmission may be caused by requesting transmission of unnecessary data in the communication system. A system for broadcast application may require use of specific broadcast parameters. At a time before receiving the broadcast services, a mobile station may request transmission of such broadcast parameters from a serving base station. Such broadcast parameters may include the broadcast modulation format information, data rate information, encryption key information, coding information, broadcast channel frequency information and other similar type information. Several base stations may be controlled by a common broadcast controller. Therefore, as long as the mobile station is within the coverage areas of these base stations, the mobile station does not need to request retransmission of the broadcast parameters. However, the mobile station may not have a reliable way of determining whether a new base station uses the same or different broadcast controller when the mobile station moves to the coverage area of the new base station. As such, the mobile station may request transmission of broadcast parameters every time it moves to the coverage area of a new base station. Requesting and receiving the transmission of the broadcast parameters may interrupt the broadcast services played at the mobile station, and cause unnecessary and excessive transmissions in the communication system.

Therefore, there is a need for a method, apparatus and system for updating a mobile station broadcast parameters for broadcast services in a communication system.

SUMMARY

A method, apparatus and system provide for efficient use of communication resources for providing broadcast services in a communication system. A receiver receives a first broadcast controller identification from a first base station, and a second broadcast controller identification from a second base station. A controller coupled to the receiver determines whether the first and second broadcast controller identifications are associated with use of a common set of broadcast parameters. A transmitter transmits a request for transmission of a new set of broadcast parameters when the first and second broadcast controller identifications are not associated with use of the common set of broadcast parameters. After receiving the new set of broadcast parameters, the receiver uses the new set of broadcast parameters for receiving broadcast services.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Generally stated, a novel and improved system, method and apparatus provide for efficient use of communication resources for broadcast services in a communication system. A set of broadcast parameters is associated with one or more broadcast controllers in accordance with various aspects of the invention. While using a first broadcast controller through a first base station, obtaining a second broadcast controller identification from a second base station triggers a process for determining whether the first and second broadcast controller identifications are associated with a common set of broadcast parameters. Requesting transmission of a new set of broadcast parameters is triggered when the first and second broadcast controller identifications are not associated with a common set of broadcast parameters in accordance with various aspects of the invention. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

More specifically, various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by accessing the world wide web at the address: http://www.3gpp2.org, or by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Figure 1:
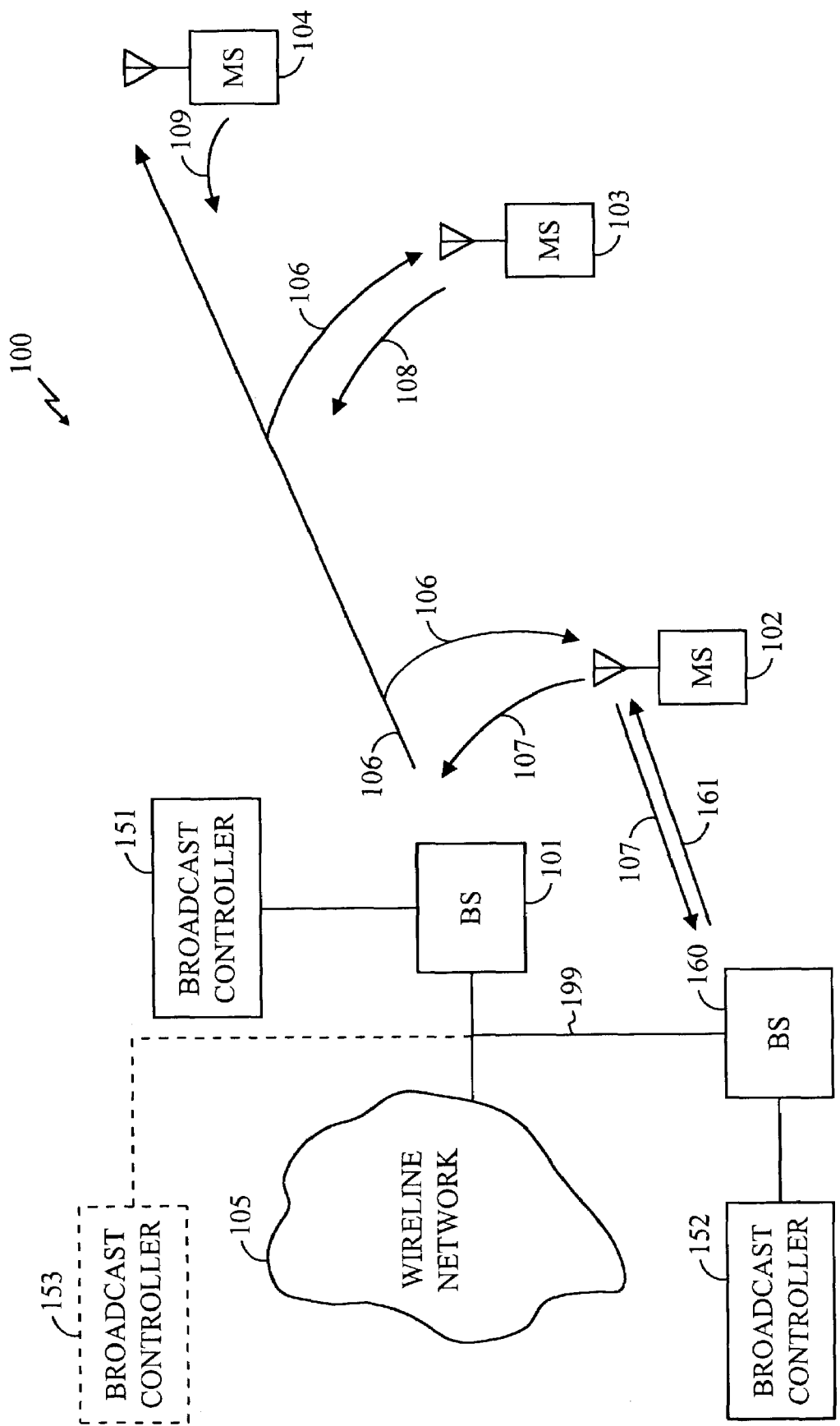
FIG. 1 depicts a communication system capable of providing broadcast services in accordance with various aspects of the invention.

FIG. 1 illustrates a general block diagram of a communication system 100 capable of operating in accordance with any of the code division multiple access (CDMA) communication system standards while incorporating various embodiments of the invention. Communication system 100 may be for communications of voice, data or both. Generally, communication system 100 includes a base station 101 that provides communication links between a number of mobile stations, such as mobile stations 102-104, and between the mobile stations 102-104 and a public switch telephone and data network 105. The mobile stations in FIG. 1 may be referred to as data access terminals (AT) and the base station as a data access network (AN) without departing from the main scope and various advantages of the invention. Base station 101 may include a number of components, such as a base station controller and a base transceiver system. For simplicity, such components are not shown. Base station 101 may be in communication with other base stations, for example base station 160. A mobile switching center (not shown) may control various operating aspects of the communication system 100 and in relation to a back-haul 199 between network 105 and base stations 101 and 160.

Base station 101 communicates with each mobile station that is in its coverage area via a forward link signal transmitted from base station 101. The forward link signals targeted for mobile stations 102-104 may be summed to form a forward link signal 106. The forward link may carry a number of different forward link channels. Each of the mobile stations 102-104 receiving forward link signal 106 decodes the forward link signal 106 to extract the information that is targeted for its user. Base station 160 may also communicate with the mobile stations that are in its coverage area via a forward link signal transmitted from base station 160. Mobile stations 102-104 communicate with base stations 101 and 160 via corresponding reverse links. Each reverse link is maintained by a reverse link signal, such as reverse link signals 107-109 for respectively mobile stations 102-104. The reverse link signals 107-109, although may be targeted for one base station, may be received at other base stations.

Base stations 101 and 160 may be simultaneously communicating to a common mobile station. For example, mobile station 102 may be in close proximity of base stations 101 and 160, which can maintain communications with both base stations 101 and 160. On the forward link, base station 101 transmits on forward link signal 106, and base station 160 on the forward link signal 161. On the reverse link, mobile station 102 transmits on reverse link signal 107 to be received by both base stations 101 and 160. For transmitting a packet of data to mobile station 102, one of the base stations 101 and 160 may be selected to transmit the packet of data to mobile station 102. On the reverse link, both base stations 101 and 160 may attempt to decode the traffic data transmission from the mobile station 102. The data rate and power level of the reverse and forward links may be maintained in accordance with the channel condition between the base station and the mobile station.

The communication system 100 may also provide broadcast services to the mobile stations. Broadcast services may include receiving video or audio broadcast through base stations 101 and 160. In another example, the weather or traffic information may be broadcasted for the mobile stations. In a broadcast system, the same signal may be sent simultaneously to a large number of mobile stations. The broadcast signal may be encrypted. Therefore, the mobile stations may need to sign up for such services. The mobile station may need to obtain encryption information from the base station, before receiving the services. In addition, the mobile station may need to receive other broadcast parameters in order to receive the broadcast services. The broadcast parameters may include the broadcast channel identifier, broadcast modulation format information, data rate information, encryption key information, coding information, broadcast channel frequency information, encryption and decryption keys information, header compression information, and other similar type information. The broadcast services may be controlled by a broadcast controller. The broadcast controller provides the broadcast programming, transmission and control of the broadcast services. The broadcast controller also provides the aforementioned broadcast parameters to the authorized mobile stations. The broadcast controller may verify that the mobile station has signed up for the requested broadcast service before providing the broadcast parameters.

The communication system 100 may have one or more broadcast controllers. For example, in one embodiment, the base stations 101 and 160 may use a common broadcast controller 153. A common set of broadcast parameters is provided to base stations 101 and 160, and to the mobile stations within the coverage area of base stations 101 and 160. In accordance with various aspects of the invention, the base stations 101 and 160 transmit a broadcast controller identification. When a mobile station roams into the coverage area of a base station, the mobile station receives the broadcast controller identification. The broadcast controller identification may be transmitted by the base station periodically or transmitted based on a request by a mobile station. In another embodiment, the broadcast controller identification may be included with other information that a mobile station normally acquires from a base station when it roams into the coverage area of the new base station. Various interoperability standards, incorporated herein, provide one or more methods for exchange of information when a mobile station roams into a new coverage area.

In another embodiment, in communication system 100, the base station 101 may use broadcast controller 151, and the base station 160 may use a different broadcast controller 152. The broadcast parameters used by the broadcast controllers 151 and 152 may be different. The broadcast controller identifications received from base stations 101 and 160, therefore, are not associated with a common set of broadcast parameters. As such, when a mobile station roams into the coverage area of base station 160 from coverage area of base station 101, the mobile station needs to receive a new set of broadcast parameters associated with the broadcast controller 1152.

Figure 2:
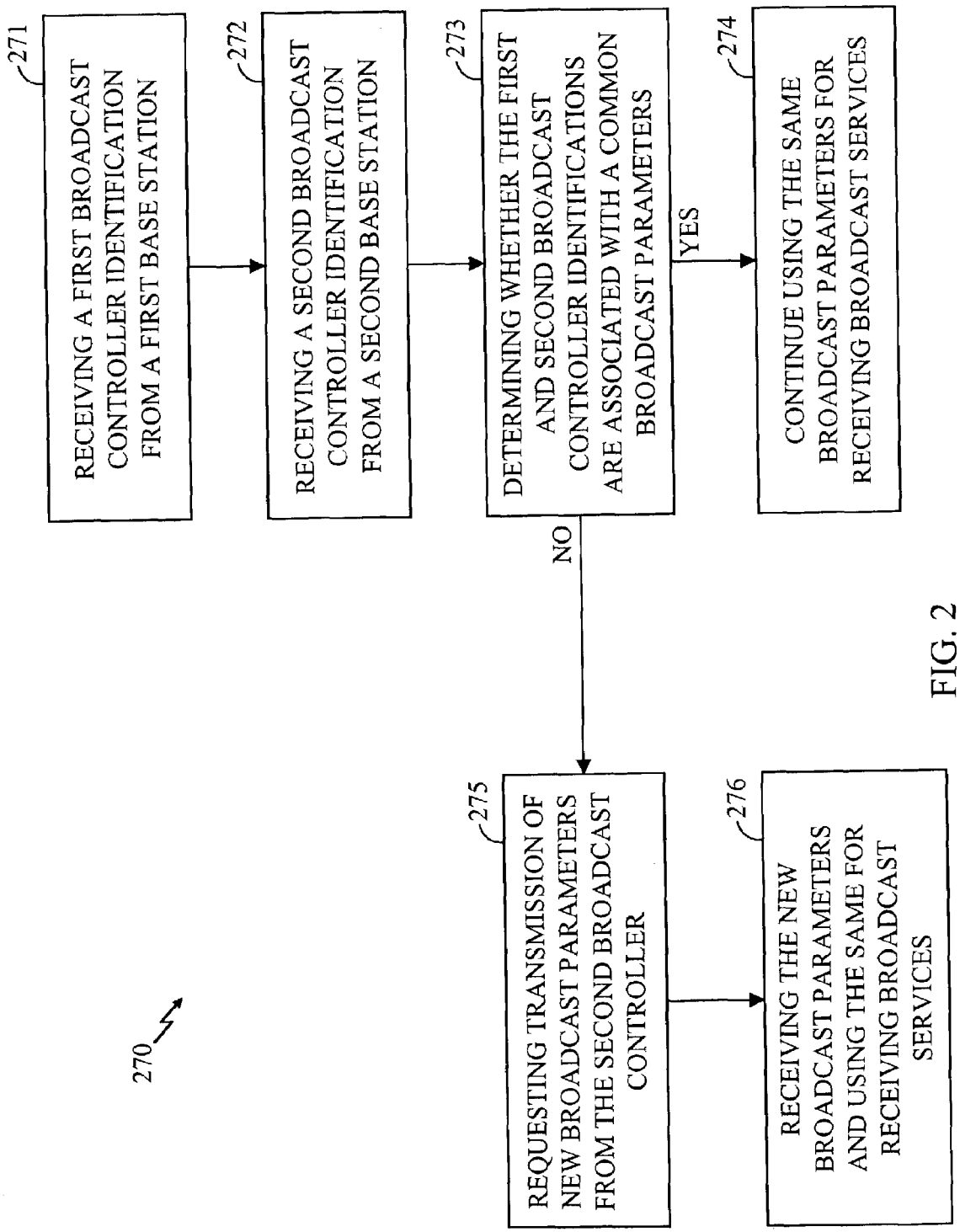
FIG. 2 depicts a flow chart of various steps that may be used for obtaining and updating broadcast parameters of a mobile station for broadcast services in accordance with various aspects of the invention.

Referring to FIG. 2, a flow chart 270 outlines several steps that may be performed by a mobile station roaming from coverage area of a first base station to coverage area of a second base station to efficiently receive and change the broadcast parameters in order to receive broadcast services in communication system 100, in accordance with various aspects of the invention. At step 271, the mobile station, for example mobile station 102 roaming from coverage areas of base station 101 to base station 160, has received a first broadcast controller identification from a first base station, for example base station 101. At step 272, the mobile station receives a second broadcast controller identification from a second base station, for example base station 160. The first broadcast controller identification may be associated with the broadcast controller 151, and the second broadcast controller identification may be associated with the broadcast controller 152. At step 273, the mobile station may determine whether the first and the second broadcast controller identifications are associated with a common broadcast parameters. In one embodiment, the broadcast controllers 151 and 152 may be using the same parameters. In another embodiment, the first and second broadcast controller identifications may be associated to a common broadcast controller 153 that may be used for both the base stations 101 and 160. As such, at step 274, the mobile station continues to use the same broadcast parameters for receiving the broadcast services. At step 275, if the first and the second broadcast controller identifications are not associated with a common broadcast parameters, the mobile station requests transmission of a new set of broadcast parameters from the second broadcast controller, for example broadcast controller 152. The transmission of the parameters may take place by the second base station, for example base station 160. At step 276, the mobile station receives the new set of broadcast parameters and continues to receive broadcast services using the new set of broadcast parameters.

Figure 3:
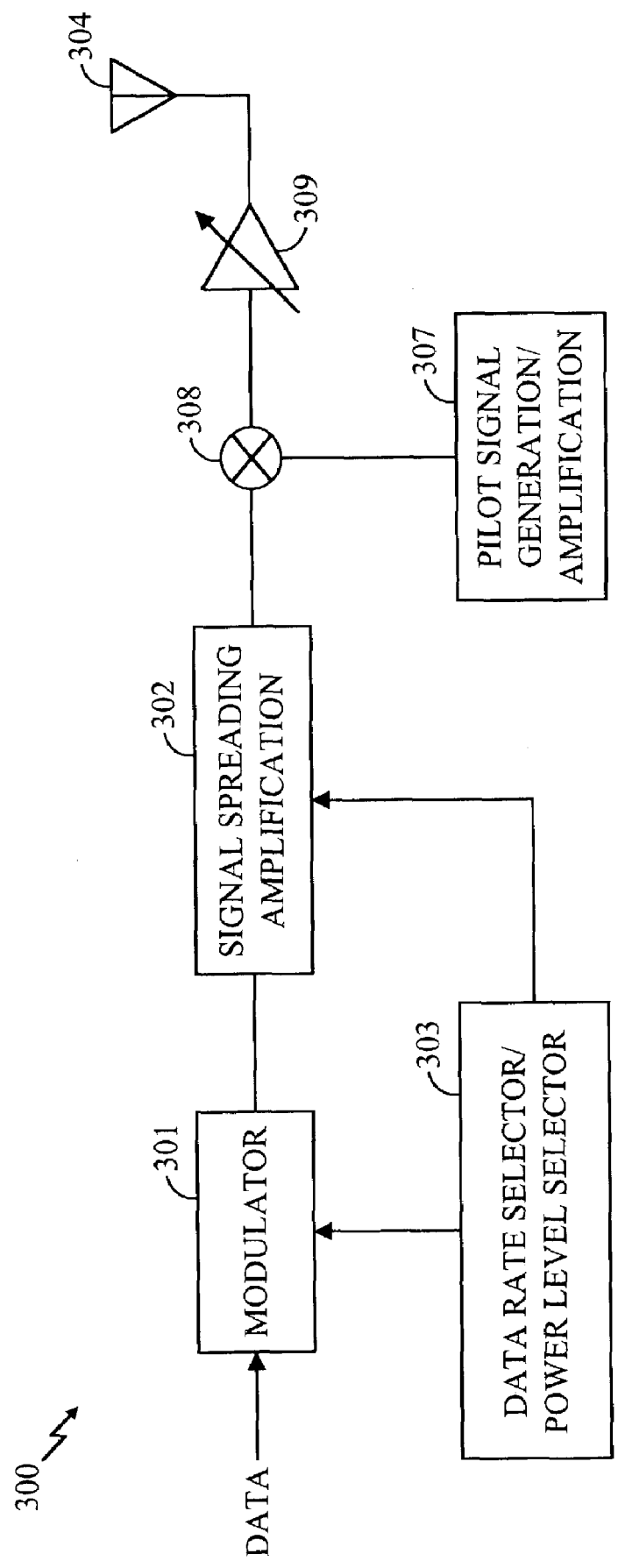
FIG. 3 depicts a transmitter capable of operating in accordance with various aspects of the invention for broadcast services.

FIG. 3 illustrates a block diagram of a transmitter 300 for transmitting the reverse and forward link signals. The transmitter 300 may be used for transmission of fundamental channels, control channels, supplemental channels, and broadcast channels. The broadcast channel data for transmission are input to a modulator 301 for modulation. The modulation may be according to any of the commonly known modulation techniques such as QAM, PSK or BPSK. Before modulation, the broadcast channel data for transmission may pass through one or more layers of coding. The modulation data rate may be selected by a data rate and power level selector 303. The data rate selection may be based on feedback information received from a destination or may be fixed for the broadcast channel. In case of a feedback, the data rate very often is based on the channel condition, among other considered factors. The data rate and power level selector 303 accordingly selects the data rate in modulator 301. The output of modulator 301 passes through a signal spreading operation and amplified in a block 302 for transmission from an antenna 304. The data rate and power level selector 303 also selects a power level for the amplification level of the transmitted signal. The combination of the selected data rate and the power level allows proper decoding of the transmitted data at the receiving destination. A pilot signal is also generated in a block 307. The pilot signal is amplified to an appropriate level in block 307. The pilot signal power level may be in accordance with the channel condition at the receiving destination. The pilot signal may be combined with the channel signal in a combiner 308. The combined signal may be amplified in an amplifier 309 and transmitted from antenna 304. The antenna 304 may be in any number of combinations including antenna arrays and multiple input multiple output configurations. The selected modulation, data rate and the coding technique for transmission of broadcast channel data may be in accordance with the broadcast parameters set forth by the broadcast controller. For example, if the base station 101, incorporating transmitter 300, is transmitting the broadcast channel and the broadcast controller 151 is controlling the broadcast information, the broadcast parameters of the broadcast controller 151 are used in transmitter 300 for transmission of broadcast channel. Therefore, the selected modulation, data rate and the coding technique may be three of the broadcast parameters that need to be communicated to the mobile station in the set of broadcast parameters.

Figure 4:
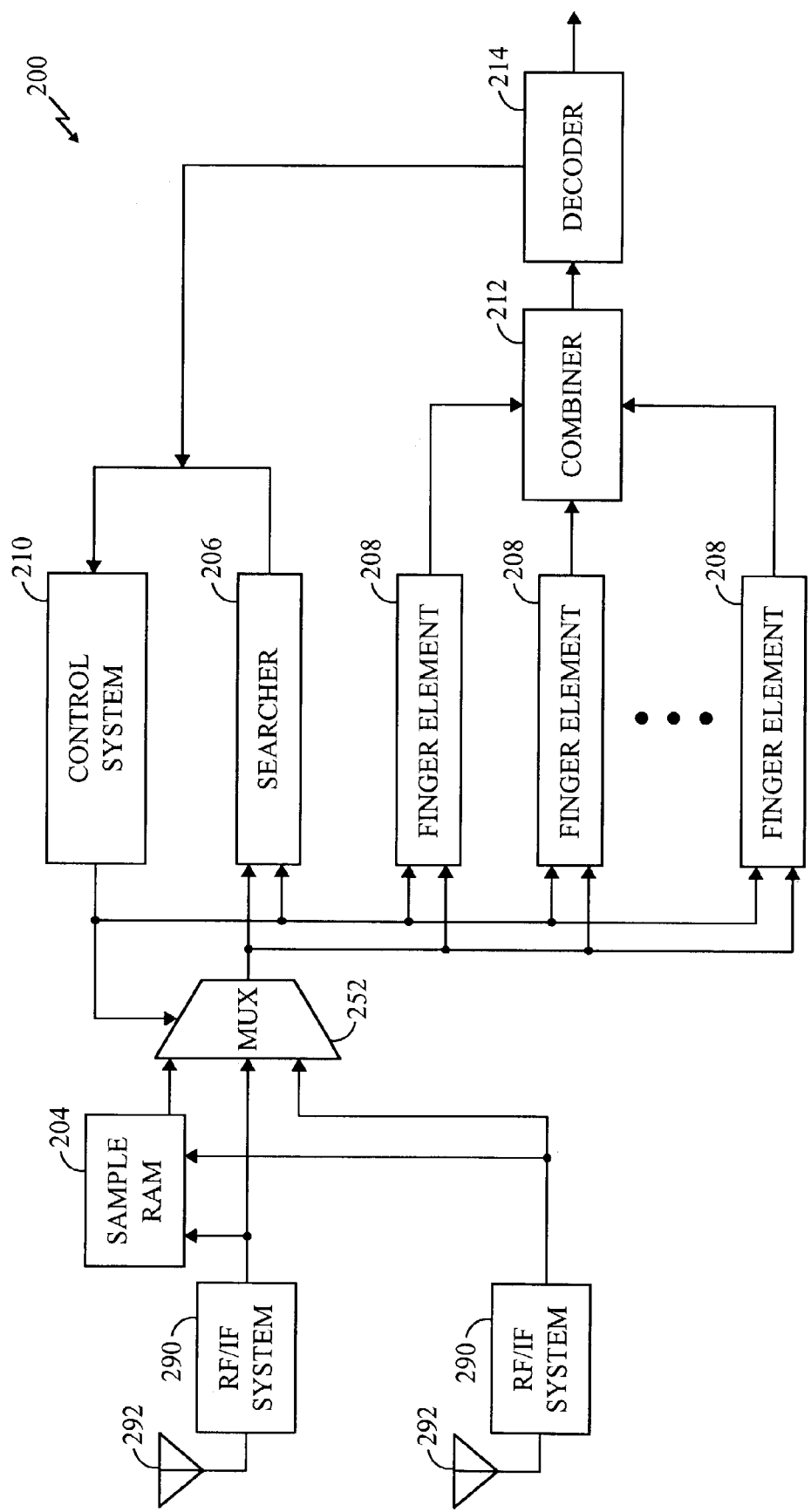
FIG. 4 depicts a receiver capable of operating in accordance with various aspects of the invention for broadcast services.

FIG. 4 illustrates a block diagram of a receiver 200 used for processing and demodulating the received CDMA signal while operating in accordance with various aspects of the invention. Receiver 200 may be used for decoding the information on the reverse and forward links signals. Receiver 200 may be used for decoding information on the fundamental channel, control channel, supplemental channels, and the broadcast channels. Received (Rx) samples may be stored in RAM 204. Receive samples are generated by a radio frequency/intermediate frequency (RF/IF) system 290 and an antenna system 292. The RF/IF system 290 and antenna system 292 may include one or more components for receiving multiple signals and RF/IF processing of the received signals for taking advantage of the receive diversity gain. Multiple received signals propagated through different propagation paths may be from a common source. Antenna system 292 receives the RF signals, and passes the RF signals to RF/IF system 290. RF/IF system 290 may be any conventional RF/IF receiver. The received RF signals are filtered, down-converted and digitized to form RX samples at base band frequencies. The samples are supplied to a multiplexer (mux) 252. The output of mux 252 is supplied to a searcher unit 206 and finger elements 208. A control system 210 is coupled thereto. A combiner 212 couples a decoder 214 to finger elements 208. Control system 210 may be a microprocessor controlled by software, and may be located on the same integrated circuit or on a separate integrated circuit. The decoding function in decoder 214 may be in accordance with a turbo decoder or any other suitable decoding algorithms. The signal transmitted from a source may be encoded with several layers of codes. As such, the decoder 214 decodes the received samples in accordance with such codes. The decoder 214 may perform decoding function in accordance with the coding information received in the broadcast parameters.

During operation, received samples are supplied to mux 252. Mux 252 supplies the samples to searcher unit 206 and finger elements 208. Control unit 210 configures finger elements 208 to perform demodulation and despreading of the received signal at different time offsets based on search results from searcher unit 206. The results of the demodulation are combined and passed to decoder 214. The demodulation function may be performed in accordance with the modulation information received in the broadcast parameters. Decoder 214 decodes the data and outputs the decoded data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. Receiver 200 may be used in a receiver portion of base stations 101 and 160 for processing the received reverse link signals from the mobile stations, and in a receiver portion of any of the mobile stations for processing the received forward link signals.

Figure 5:
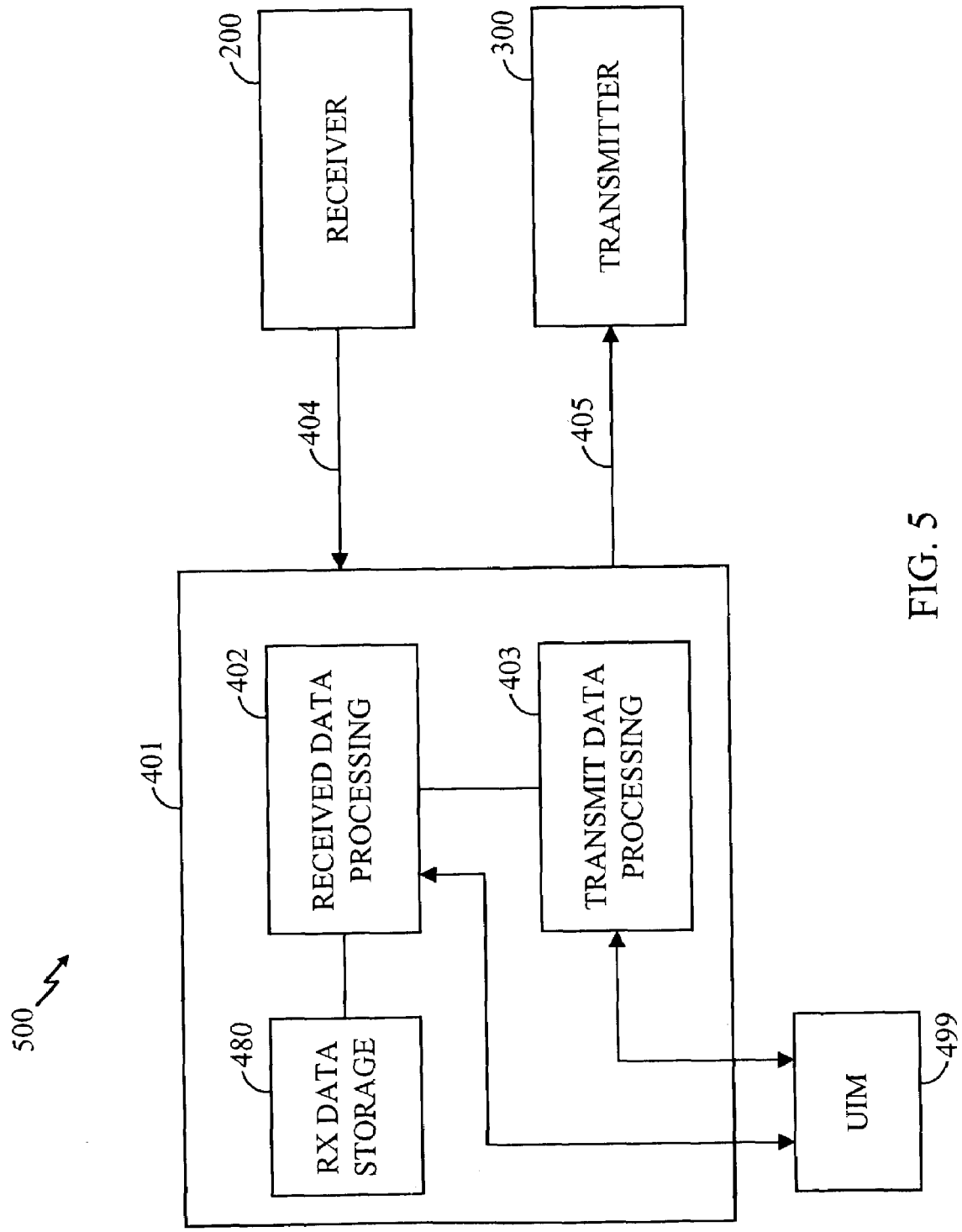
FIG. 5 depicts a transceiver system capable of operating in accordance with various aspects of the invention for broadcast services.

FIG. 5 depicts a general diagram of a transceiver system 500 for incorporating receiver 200 and transmitter 300 for maintaining a communication link with a destination, including receiving broadcast channels. The transceiver 500 may be incorporated in a mobile station or a base station. A processor 401 may be coupled to receiver 200 and transmitter 300 to process the received and transmitted data. Various aspects of the receiver 200 and transmitter 300 may be common, even though receiver 200 and transmitter 300 are shown separately. In one aspect, receiver 200 and transmitter 300 may share a common local oscillator and a common antenna system for RF/IF receiving and transmitting. Transmitter 300 receives the data for transmission on input 405. Transmit data processing block 403 prepares the data for transmission on a transmit channel. If the transmit channel is a broadcast channel, the processing of data is in accordance with the broadcast parameters used by the transceiver 500. Received data, after being decoded in decoder 214, are received at processor 401 at an input 404. Received data are processed in received data processing block 402 in processor 401. If the received channel is a broadcast channel, the processing of the received broadcast data is in accordance with the broadcast parameters used by the transmitter for transmitting the broadcast channel. Various operations of processor 401 may be integrated in a single or multiple processing units. The transceiver 500 may be connected to another device. The transceiver 500 may be an integral part of the device. The device may be a computer or operates similar to a computer. The device may be connected to a data network, such as Internet. In case of incorporating the transceiver 500 in a base station, the base station through several connections may be connected to a network, such as Internet.

The processing of the received data generally includes checking for error in the received packets of data. For example, if a received packet of data has error at an unacceptable level, the received data processing block 402 sends an instruction to transmit data processing block 403 for making a request for retransmission of the packet of data. The request is transmitted on a transmit channel. However, for the broadcast channel, the receiver operation may not include a request for retransmission. The broadcast service may include sending video from the base station and playing the same video at the mobile station. The broadcast channel data may be transmitted in a block of data at a time. As such, the receive data storage block 480 may accumulate data received in each frame of data to reconstruct the block of data for the playing the video of the broadcast services at the mobile station.

A broadcast controller, such as any of the broadcast controllers 151, 152 and 153, may control broadcast services of a large number of base stations in a communication system. A set of base stations may form a subnet of base stations. The base station may transmit a subnet identifier to the mobile stations. The subnet identifier identifies the subnet. All base stations in a subnet may be served by the same broadcast controller. The subnet identification sent from each base station in a subnet may indicate that they belong to a common subnet in accordance with various aspects of the invention. As such, when the mobile station is roaming among the base stations of a subnet, the mobile station uses the same broadcast parameters for broadcast services. In accordance with various aspects of the invention, the mobile station determines, while referring to FIG. 2, at step 273, whether the first and second base stations belong to a common subnet having a common broadcast controller, and hence a common broadcast controller identification and common broadcast parameters. As such, when the first and second base stations belong to a common subnet, the mobile station uses the same broadcast parameters for broadcast services. When the first and second base stations belong to different subnets, at steps 275 and 296, the mobile station may request and receive a new set of broadcast parameters.

Figure 6:
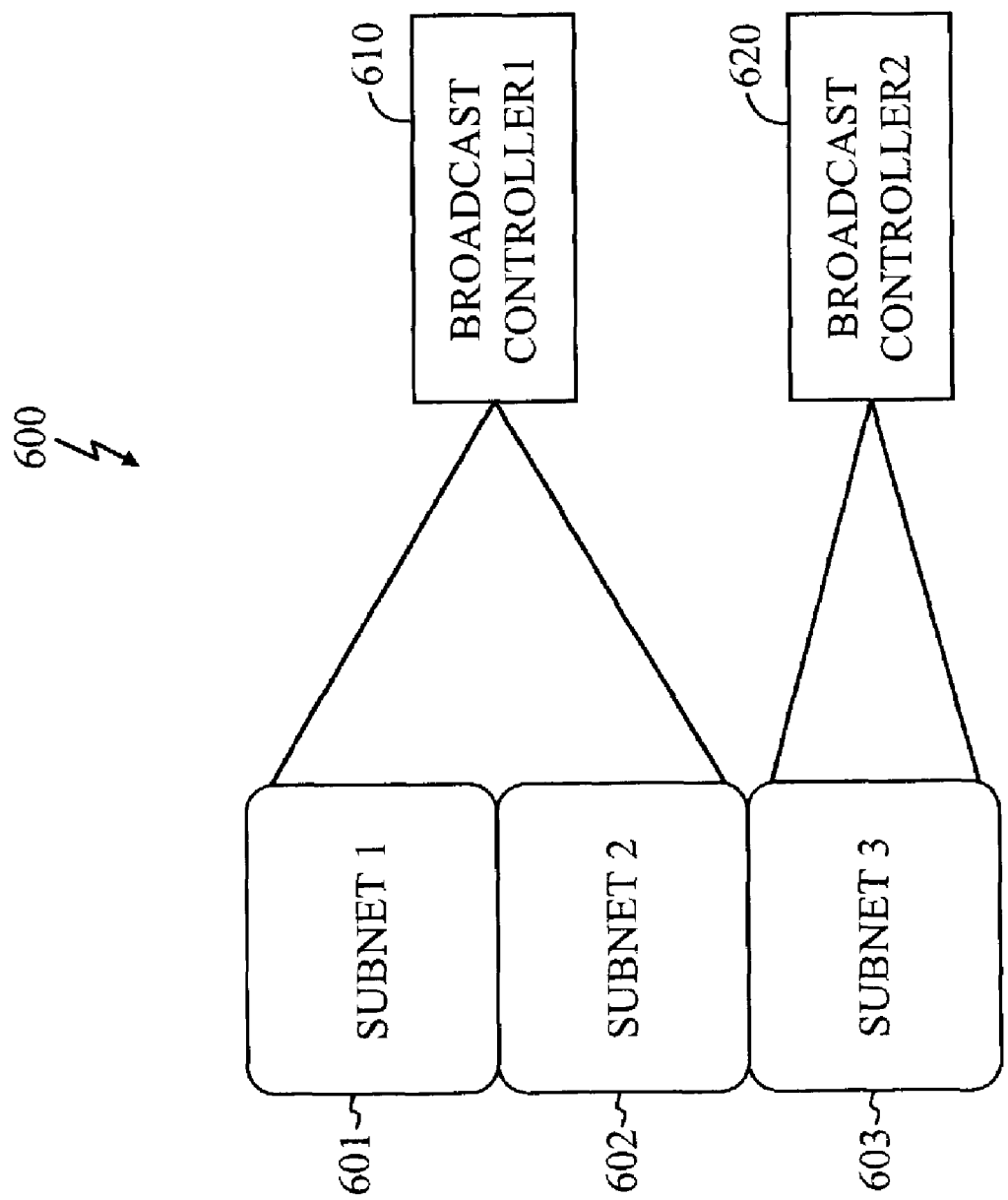
FIG. 6 depicts at least one configuration of a communication system subnets and broadcast controllers for broadcast services.

Moreover, several subnets may be controlled by a common broadcast controller, in another exemplary embodiment. Referring to FIG. 6, an exemplary communication system subnets configuration 600 is shown. The broadcast controller 610 may control the broadcast services of all the base stations in the subnet 601 and subnet 602. The broadcast controller 620 may control the broadcast services of all the base stations in the subnet 603. As such, when the mobile station determines that the base station belongs to different subnets, the mobile station and/or base station determines whether the mobile station needs a new set of broadcast parameters. The communication for determining whether a new set of broadcast parameters are necessary may be via communications of several messages. For example, the base station may determine whether the subnet of the previous base station and the subnet of the current base station are served by the same broadcast controller. The base station may perform this function by maintaining a list of other subnets served by the broadcast controller that serves this base station. In another embodiment, either the base station or the broadcast controller sends to the mobile station a list of subnets controlled by a common broadcast controller. The list may also be the identifiers for identifying the base station members of each subnet. This list of subnets may be sent to the mobile station along with the broadcast parameters. When the mobile station enters the coverage area of a base station belonging to a different subnet, the mobile stations checks whether the new subnet is included in the list of subnets controlled by the current broadcast controller. If so, the mobile station continues to use the current broadcast parameters. Otherwise, the mobile station requests from the new broadcast controller for a new set of broadcast parameters. Since the list of subnets may be very large, the broadcast controller may provide the mobile station only a partial list of subnets controlled by the broadcast controller. This list may be updated as the mobile station moves to the edge of the subnets included in the current list. In another embodiment, the information may be encoded by indicating a series of consecutive subnet identification numbers. The message, therefore, may include the first and last subnet identification (or base station identification numbers) of the series of consecutive subnets (or base stations) identification numbers. In another embodiment, the base stations bordering the coverage areas may transmit a message indicating a need for requesting a new set of broadcast parameters because the mobile station may be entering the coverage area of a base station in a subnet controlled by a different broadcast controller. In such a case, when the mobile station roams from a base station of a first subnet controlled by a first broadcast controller to another base station of a second subnet controlled by a second broadcast controller, the mobile station sends a request to the second base station for transmission of the broadcast parameters associated with the second broadcast controller.

The broadcast channel may transmit encrypted data to prevent unauthorized users from using the broadcast services. A user identity module (UIM) 499 shown in FIG. 5 may contain user specific information including an encryption key. Two patent applications filed with assigned Ser. No. 09/933,972 and 10/233,188, with the title: Method and Apparatus for Security in a Data Processing System, assigned to the assignee of the present application, details various embodiments for encrypted communications, incorporated by reference herein. The UIM 499 is associated with a particular user and is used primarily to verify that a mobile station incorporating transceiver 500 is entitled to the privileges afforded to the user, such as access to the mobile phone network. Therefore, a user is associated with the UIM 499 rather than a mobile station. The same user may be associated with multiple UIM 499.

The broadcast service faces a problem in determining how to distribute keys to subscribed users. To decrypt the broadcast content at a particular time, the mobile station must know the current decryption key that is valid in the current subnet. To avoid theft-of-service, the decryption key should be changed frequently, for example, every minute. These decryption keys are called Short-term Keys (SK). The SK is used to decrypt the broadcast content for a short-amount of time. The SK is derived from a Broadcast Access Key that may be stored in the UIM. The list of subnets controlled by a broadcast controller may be stored in the UIM along with the Broadcast Access Key. The mobile station may need to obtain the Broadcast Access Key from the broadcast controller in the set of broadcast parameters. The UIM receives an identifier for the current subnet along with a request to compute the SK. The UIM may check if the Broadcast Access Key is valid in the current subnet. If the Broadcast Access Key is not valid in the current subnet, the UIM may send an indication to initiate a process to obtain a new key from the new broadcast controller to continue the reception of broadcast services.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for providing broadcast services, comprising:
   receiving a first, broadcast controller identification from a first base station;
   receiving a second broadcast contoller identification from a second base station;
   determining whether the first and second broadcast controller identifications are associated with use of a common set of broadcast parameters; and
   requesting transmission of a new set of broadcast parameters from the second base station if the first and second broadcast controller identifications are not associated with use of the common set of broadcast parameters.

2. The method as recited in claim 1 further comprising:
   continuing to use the common set of broadcast parameters if the first and second broadcast controller identifications are associated with use of the common set of broadcast parameters.

3. The method as recited in claim 1 further comprising:
   receiving said new set of broadcast parameters.

4. The method as recited in claim 3 further comprising:
   using said new set of broadcast parameters for receiving broadcast services.

5. An apparatus for providing broadcast services, comprising:
   a receiver for receiving a first broadcast controller identification from a first base station, and for receiving a second broadcast controller identification from a second base station;
   a controller for determining whether the first and second broadcast controller identifications are associated with use of a common set of broadcast parameters;
   a transmitter for requesting transmission of a new set of broadcast parameters from the second base station if the first and second broadcast controller identifications are not associated with use of the common set of broadcast parameters.

6. The apparatus as recited in claim 5, wherein, said receiver continues to use the common set of broadcast parameters; if the first and second broadcast controller identifications are associated with use of the common set of broadcast parameters.

7. The apparatus as recited in claim 6 wherein said controller and receiver are further for using said new set of broadcast parameters for receiving broadcast services.

8. A method for providing broadcast services, comprising:
   receiving broadcast services from a first base station;
   roaming into coverage area or a second base station;
   determining whether the first and second base stations are associated with a common broadcast controller; and
   requesting transmission of a new set of broadcast parameters from the second base station if the first and second base stations are not associated with the common broadcast controller.

9. The method as recited in claim 8 further comprising:
   continuing to use a common set of broadcast parameters.

10. The method as recited in claim 8 further comprising:
    requesting transmission or a new set of broadcast parameters when the first and second base stations are not associated with a common broadcast controller.

11. The method as recited in claim 10 further composing:
    receiving said new set of broadcast parameters.

12. The method as recited in claim 11 further comprising:
    using said new set of broadcast parameters for receiving broadcast services.

13. The method as recited in claim 8, the receiving broadcast services from a first base station further comprising:
    receiving a list of subnets controlled by a common broadcast controller.

14. The method as recited in claim 13, the determining whether the first and second base stations are associated with a common broadcast controller further comprising:
    determining if the received list of subnets comprises a subnet associated with the second base station.

15. The method as recited in claim 13, the determining whether the first and second base stations are associated with a common broadcast controller further comprising:
  determining whether the first and second base stations are associated with a common set of broadcast parameters.

16. An apparatus for providing broadcast services, comprising:
  a receiver for receiving broadcast services from a first base station;
  a controller for detecting roaming of said receiver into coverage area of a second base station;
  said controller further for determining whether the first and second base stations are associated with a common broadcast controller and
  a transmitter for requesting transmission of a new set of broadcast parameters from the second base station if the first and second base stations are not associated with the common broadcast controller.

17. The apparatus as recited in claim 16 wherein said receiver continues to use a common set of broadcast parameters.

18. The apparatus as recited in claim 16 wherein said receiver is further receiving said new set of broadcast parameters.

19. The apparatus as recited in claim 18 wherein said controller and said receiver are further for using said new set of broadcast parameters for receiving broadcast services.

20. An apparatus for providing broadcast services, comprising:
  means for receiving a first broadcast controller identification from a first base station;
  means for receiving a second broadcast controller identification from a second base station;
  means for determining whether the first and second broadcast controller identifications are associated with use of a common set of broadcast parameters; and
  means for requesting transmission of a new set of broadcast parameters from the second base station if the first and second broadcast controller identifications are not associated with use of the common set of broadcast parameters.

21. The apparatus as recited in claim 20 further comprising:
  means for continuing to use the common set of broadcast parameters if the first and second broadcast controller identifications are associated with use of the common set of broadcast parameters.

22. The apparatus as recited in claim 20 further comprising:
  means for receiving said new set of broadcast parameters.

23. The apparatus as recited in claim 22 further comprising:
  means for using said new set of broadcast parameters for receiving broadcast services.

24. A processor-readable medium including processor-executable instructions encoded thereon for performing a method for providing broadcast services, the in method comprising:
  receiving a first broadcast controller identification from a first base station;
  receiving a second broadcast controller identification from a second base station;
  determining whether the first and second broadcast controller identifications are associated with use of a common set of broadcast parameters; and
  requesting transmission of a new set of broadcast parameters from the second base station if the first and second broadcast controller identifications are not associated with use of the common set of broadcast parameters.

25. A mobile station, comprising:
  a receiver for receiving a first broadcast controller identification from a first base station, and for receiving a second broadcast controller identification from a second base station;
  a controller for determining whether the first and second broadcast controller identifications are associated with use of a common set of broadcast parameters;
  a transmitter for requesting transmission of a new set of broadcast parameters from the second base station if the first and second broadcast controller identifications are not associated with use of the common set of broadcast parameters; and
  an antenna coupled to the receiver to receive the first and second broadcast controller identifications, the antenna further coupled to the transmitter to request the transmission of the new set of broadcast parameters.

26. A processor-readable medium including processor-executable instructions encoded thereon for performing a method for providing broadcast services, the method comprising:
  receiving broadcast services from a first base station;
  roaming into coverage area of a second base station;
  determining whether the first and second base stations are associated with a common broadcast controller; and
  requesting transmission of a new set of broadcast parameters from the second base station it the first and second base stations are not associated with the common broadcast controller.

27. An apparatus for providing broadcast services, comprising:
  means for receiving broadcast services from a first base station;
  means for roaming into coverage area of a second base station;
  means for determining whether the first and second base stations are associated with a common broadcast controller; and
  means for requesting transmission or a new set of broadcast parameters from the second base station if the first and second base stations are not associated with the common broadcast controller.

28. A mobile station, comprising:
  a receiver for receiving broadcast services from a first base station;
  a controller fix detecting roaming of said receiver into coverage area of a second base station;
  said controller thither for determining whether the first and second base stations are associated with a common broadcast controller;
  a transmitter for requesting transmission of a new set of broadcast parameters from the second base station if the first and second base stations are not associated with the common broadcast controller; and
  an antenna coupled to the receiver to receive the broadcast services from the first base station, the antenna further coupled to the transmitter to request the transmission of the new set of broadcast parameters.

* * * * *

UNITED STATES PATENT AND TRADEMARK OFFICE
CERTIFICATE OF CORRECTION

PATENT NO. : 7,599,655 B2
APPLICATION NO. : 10/335626
DATED : October 6, 2009
INVENTOR(S) : Agashe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 991 days.

Signed and Sealed this

Twenty-eighth Day of September, 2010

David J. Kappos
*Director of the United States Patent and Trademark Office*